(12) United States Patent
Kvist et al.

(10) Patent No.: US 10,337,543 B2
(45) Date of Patent: Jul. 2, 2019

(54) SECURING A SECOND OBJECT TO A FIRST OBJECT

(71) Applicant: MultiMaterial-Welding AG, Stansstad (CH)

(72) Inventors: Joakim Kvist, Nidau (CH); Philipp Bernhard, Thun (CH); Martin Sigrist, Bern (CH); Laurent Torriani, Lamboing (CH); Mario Weiss, Diessbach bei Büren (CH); Hannes Merz, Olten (CH); Antonino Lanci, Bern (CH); Samuel Malzach, Evilard (CH); Nicholas Aldersley, Hebertshausen (DE)

(73) Assignee: MULTIMATERIAL-WELDING AG, Stansstad (CH)

( * ) Notice: Subject to any disclaimer, the term of this patent is extended or adjusted under 35 U.S.C. 154(b) by 0 days.

(21) Appl. No.: 15/942,731

(22) Filed: Apr. 2, 2018

(65) Prior Publication Data

US 2018/0283422 A1 Oct. 4, 2018

(30) Foreign Application Priority Data

Apr. 4, 2017 (CH) .................................. 00446/17

(51) Int. Cl.
*F16B 5/00* (2006.01)
*F16B 43/00* (2006.01)
(Continued)

(52) U.S. Cl.
CPC .......... *F16B 5/0088* (2013.01); *F16B 5/0032* (2013.01); *F16B 5/0233* (2013.01);
(Continued)

(58) Field of Classification Search
CPC ...... F16B 5/0088; F16B 5/0032; F16B 12/46; F16B 5/0233; F16B 17/00; B62D 25/163
See application file for complete search history.

(56) References Cited

U.S. PATENT DOCUMENTS 3,778,957 A * 12/1973 Appleberry ........... F16B 5/0233
52/127.5
3,890,759 A * 6/1975 Selden .................. E04B 1/2604
403/217
(Continued)

FOREIGN PATENT DOCUMENTS

DE 298 13 726 10/1998
DE 202011052036 U1 * 2/2013 ................ F16B 5/00
(Continued)

OTHER PUBLICATIONS

Switzerland Search Report dated Aug. 22, 2017, Application No. 4462017, 2 pages.

*Primary Examiner* — Jeanette E Chapman
(74) *Attorney, Agent, or Firm* — Rankin, Hill & Clark LLP

(57) ABSTRACT

An adaptor is secured to a first object. The adaptor includes an anchoring part and an adjustment part. The anchoring part includes a distally facing anchoring surface and a proximally facing first control surface. The adjustment part has a distally facing second control surface positioned to abut against the first control surface. The first control surface or the second control surface or both is/are helical. Thereby a relative z position of the adjustment part with respect to the anchoring part is defined by the relative orientation of the adjustment part with respect to the common axis while the second control surface abuts against the first control surface. This is used to adjust the z position of the adjustment part relative to the first object, in connection with the orientation (Continued)

of the adjustment part being defined and possibly fixed by the function of the adaptor/the adjustment part.

13 Claims, 3 Drawing Sheets

(51) Int. Cl.
*F16B 17/00* (2006.01)
*F16B 5/02* (2006.01)
*B62D 25/16* (2006.01)
*F16B 12/46* (2006.01)
*F16B 5/04* (2006.01)
*F16B 5/06* (2006.01)
*F16B 11/00* (2006.01)

(52) U.S. Cl.
CPC .......... *F16B 43/009* (2013.01); *B62D 25/163* (2013.01); *F16B 5/045* (2013.01); *F16B 5/0628* (2013.01); *F16B 5/0642* (2013.01); *F16B 11/006* (2013.01); *F16B 12/46* (2013.01); *F16B 17/00* (2013.01)

(56) References Cited

U.S. PATENT DOCUMENTS

| | | | | |
|---|---|---|---|---|
| 4,299,067 A | * | 11/1981 | Bertschi | E04B 1/6162 403/296 |
| 4,760,495 A | * | 7/1988 | Till | F16B 5/0233 174/138 D |
| 5,280,690 A | * | 1/1994 | Hu | E04F 13/0835 52/508 |
| 5,288,191 A | * | 2/1994 | Ruckert | F16B 5/0233 403/409.1 |
| 5,531,535 A | * | 7/1996 | Lind | E04F 13/0835 403/231 |
| 5,895,189 A | | 4/1999 | Ruckert | |
| 6,200,062 B1 | | 3/2001 | You | |
| 9,795,992 B2 | * | 10/2017 | Woodgate | F16B 5/0032 |
| 2007/0207012 A1 | * | 9/2007 | Lorenzo | F16B 5/0233 411/546 |
| 2008/0075556 A1 | * | 3/2008 | Smith | E06B 1/6076 411/379 |
| 2013/0170895 A1 | * | 7/2013 | Tseng | F16B 35/06 403/270 |
| 2015/0078862 A1 | * | 3/2015 | Zhu | F16B 7/182 411/384 |
| 2016/0040700 A1 | * | 2/2016 | Trojanowski | F16B 5/0642 411/112 |
| 2016/0208477 A1 | * | 7/2016 | Finkelstein | F16B 5/0084 |

FOREIGN PATENT DOCUMENTS

| | | | | |
|---|---|---|---|---|
| DE | 10 2013 001 943 | | 3/2014 | |
| DE | 202014101383 U1 | * | 4/2014 | ............ B60R 9/04 |
| EP | 0886071 A1 | * | 12/1998 | ............ F16B 5/0233 |
| EP | 2481335 A2 | * | 8/2012 | ............ A47L 15/427 |
| EP | 2 667 042 | | 11/2013 | |
| WO | WO-0120174 A1 | * | 3/2001 | ............ F16B 5/0088 |
| WO | WO-2013186088 A1 | * | 12/2013 | ............ F16M 7/00 |
| WO | WO-2016043854 A1 | * | 3/2016 | ............ F16B 5/0233 |
| WO | 2017/055548 | | 4/2017 | |
| WO | 2017/162693 | | 9/2017 | |

* cited by examiner

SECURING A SECOND OBJECT TO A FIRST OBJECT

BACKGROUND OF THE INVENTION

Field of the Invention

The invention is in the fields of mechanical engineering and construction, especially mechanical construction, for example automotive engineering, aircraft construction, railway industry, shipbuilding, machine construction, toy construction, building industries, etc. In particular, it relates to a method of—mechanically—fastening objects to each other in a defined position.

Description of Related Art

In the automotive, aviation and other industries, there has been a tendency to move away from steel-only constructions and to use lightweight material such as aluminum or magnesium metal sheets or polymers, such as carbon fiber reinforced polymers or glass fiber reinforced polymers or polymers without reinforcement, for example polyesters, polycarbonates, etc. instead.

The new materials cause new challenges in bonding elements of these materials—especially in bonding flattish object to an other object. An example, for this is the bonding of parts of polymer-based material to metal parts, such as metal sheets.

A particular challenge when bonding elements to each other is the compensation of tolerances. In such bonds, a precise definition of the elements with respect to each other, and often also of the position of the fastener may be required. Such precise definition may especially be hard to reach if a manufacturing process has to be particularly economical and/or if the parts to be connected are comparably large in at least one dimension and/or react to the conditions they are subject to during manufacturing and use in a different manner (for example, if they have different coefficients of thermal expansion).

According to the state of the art, if different thermal expansions have to be compensated, slidable connections may be used. In this, the relative position of a connection element of one the objects to be connected with respect to the corresponding connection element of the other object is defined only with respect to two dimensions, whereas the connection elements may slide with respect to each other in the other dimension, for example a dimension of largest extension. Connecting elements for such slidable connections may include a nut slidable with respect to a groove/slot or similar.

The prior art also teaches numerical methods such as best fit calculations to determine effective positions of the connecting elements to allow for full x, y, z tolerance compensation.

SUMMARY OF THE INVENTION

It is an object of the present invention to provide a fastening method overcoming drawbacks of prior art fastening methods and especially being suited for tolerance compensation, for example based on previously made calculations. Especially, the method should be suited for z tolerance compensation, where the z direction may be defined to be the direction perpendicular to a surface to which the fastened element is attached.

In accordance with an aspect of the invention, a fastening method is provided, in which an adaptor is secured to a first object. The adaptor includes an anchoring part and an adjustment part, wherein the anchoring part includes a distally facing anchoring surface and a proximally facing first control surface. The adjustment part has a distally facing second control surface positioned to abut against the first control surface. The anchoring part and the adjustment part define a common axis that is not perpendicular to the z direction (but for example parallel to it), wherein the first control surface or the second control surface or both is/are helical with respect to the axis. Thereby a relative z position of the adjustment part with respect to the anchoring part is defined by the relative orientation of the adjustment part with respect to the common axis while the second control surface abuts against the first control surface. This is used to adjust the z position of the adjustment part relative to the first object, in connection with the orientation of the adjustment part being defined and possibly fixed by the function of the adaptor/the adjustment part.

To this end, firstly the required orientation of the adjustment part is determined. This step may be rather straightforward in many embodiments. For example, if the adjustment part includes a fastening portion equipped to cooperate with a second object, which second object has a defined—and for example fixed—orientation relative to the first object, then the step of determining the required orientation of the adjustment part merely includes determining this orientation of the second object and of an engagement structure of the second object, the engagement structure cooperating with the fastening portion. Alternatively, if the adjustment part is pre-assembled with the second object or integral with the second object or contains the second object, then determining the orientation of the adjustment part merely includes determining the (desired) orientation of the second object.

In many embodiments, for example, the first object includes a plurality of fastening locations to which a fastener secures the second objet (the fastener for example being an adaptor of the kind described herein).

Also, a target z position of the adjustment part is determined. This may be done for example based on measured or calculated geometrical data of the first object and/or the second object.

The target z position defines a target relative orientation of the anchoring part and the adjustment part, which target relative orientation may be determined in a straightforward manner given the known helix angle of the respective control surface(s). The target relative orientation together with the required orientation of the adjustment part determines a required orientation of the anchoring part.

The method includes anchoring the anchoring part with respect to the first object fixedly in this orientation. A fixed anchoring in this context may be an anchoring so that the anchoring part is immovable relative to the first object. Anchoring may be an essentially irreversible process (in contrast to, for example, screwed connections or clipped connections or bayonet fixing connections or the like), so that for example once the anchoring was carried out, a removal of the anchoring part from the first object would require a removal or breakage of material that connects the anchoring part to the first object. Especially, the anchoring may be such that once the anchoring process is finished, a re-adjustment is not possible.

For anchoring, for example an automatic pick-and-place tool may be used. In addition or as an alternative, a tool by which the anchoring step is carried out may be used to adjust the orientation of the anchoring part relative to the first object.

For adjusting and/or holding the orientation of the anchoring part relative to the first object during the process, various options exist, including:
- A sonotrode shape adapted to a feature of the anchoring part, whereby the orientation of the sonotrode with respect to a z-axis defines the orientation of the anchoring part;
- A vacuum holding mechanism (belonging to the sonotrode or possibly being external to the sonotrode);
- A co-aligned clamping or guiding system with loose or no axial fitting but fixed rotationally;
- Etc.

The method is especially suited for a purely axial joining process (joining of the adjustment part (that may optionally be pre-assembled with the second object, belong to the second object or contain the second object) and the anchoring part) in which nevertheless the z position needs to be determined and possibly adjusted. No twisting movement is necessary, and also no rotation locking. This is in contrast, for example, to a screw-and-nut connection that also makes an adjustment of the z position possible but demands a rotational movement for the joining process and requires a rotation locking once the desired z position is attained. The approach of the present invention makes possible that the angular position defines the z position (altitude).

In any embodiment, the shapes of the anchoring part and of the adjustment part may be adjusted to each other so that the adjustment part may be brought into contact with the anchoring part by an essentially axial movement without any twisting movement being necessary to bring the control surfaces into physical contact with each other.

Especially, the first control surface may be accessible from proximally, it may form part of the proximal-most surface of the anchoring part.

As mentioned hereinbefore, the orientation of the adjustment part may especially be defined by a second object to be fastened to the first object, which second object has an engagement structure cooperating with a fastening structure of the adjustment part to fasten the second object to the adjustment part. Such engagement structure may especially be such that it determines the orientation of the fastening structure.
- In an example, the fastening structure may include a plurality of fastening indentations or fastening protrusions, and the engagement structure of the second object may have an according number of protrusions/indentations shaped and arranged to match the indentations/protrusions of the fastening structure. Thereby, the arrangement of the protrusions/indentations defines the orientation.
- In another example, the fastening structure may include a nut, and the second object then has a corresponding slot. The slot defines the orientation of the nut and thereby the orientation of the adjustment part.
- Of course, it is also possible to reverse the mentioned arrangement and to provide the second object with a nut and the adjustment part with a slot.
- In even further embodiments, the adjustment part is integral with the second object.

In embodiments that includes fastening a second object to the adjustment part, the method is thus a method of anchoring a second object with respect to a first object, and the method includes the steps of:
Providing a first object,
Providing an adaptor, the adaptor including an anchoring part and an adjustment part, wherein the anchoring part includes a distally facing anchoring surface and a proximally facing first control surface,
  wherein the adjustment part includes a distally facing second control surface positioned to abut against the first control surface,
  wherein the anchoring part and the adjustment part define a common axis, and
  wherein the first control surface or the second control surface or both is/are helical with respect to the axis, whereby a relative z position of the adjustment part with respect to the anchoring part is defined by the relative orientation of the adjustment part with respect to the common axis while the second control surface abuts against the first control surface,
  and wherein the adjustment part includes a fastening portion equipped to cooperate with the second object to fasten the second object to the adjustment part, wherein the fastening portion defines an orientation of the adjustment part relative to the second object,
determining a target z position of the adjustment part,
determining from the target z position a target relative orientation of the anchoring part and the adjustment part,
anchoring the anchoring part with respect to the first object in a fixed orientation defined by the orientation of the adjustment part relative to the second object and by the target relative orientation, and
securing the adjustment part to the anchoring part, wherein the adjustment part is in the orientation defined by the second object and wherein the second control surface abuts against the first control surface.

The connection between the adjustment part and the second object may in embodiments be such that the fastening portion is slidable with respect to the engagement structure so as to be capable of compensating form different coefficients of thermal expansion between the first and second objects or similar.

Especially, if the connection between the first object and the second object includes a plurality of the adaptors, the fastening structures of the different adaptors may be aligned with each other. For example, if the fastening structures are nuts, the slots of the second object corresponding to the different nuts are parallel with each other. Especially, the slots may be oriented parallel to a longitudinal axis of the second object or of the first object.

Generally, as an option for all embodiments, the helical shape of the first and/or second control surface (if both control surfaces are helical, the helix angles of the helixes may correspond to each other) may be continuous or stepped. If the helix shape is stepped, adjustment of the z position is incremental, whereas it is continuously possible if the helix shape is continuous.

Fastening of the anchoring part in the fixed orientation may be carried out by a method that includes embedding an edge of the first object into thermoplastic material of the anchoring part. To this end, the anchoring part may include thermoplastic material in a solid state at least at the anchoring surface and the first object may have a generally flat portion with an edge. Anchoring the anchoring part with respect to the first object may then include the steps of:
  bringing the edge in contact with the anchoring surface,
  while the edge is in contact with the thermoplastic material, coupling mechanical vibration energy into the assembly (that includes the anchoring part and the first object; especially coupling the energy into the anchoring part) until a flow portion of the thermoplastic material due to friction heat generated between the edge and the thermoplastic material becomes flowable and flows around the edge to at least partially embed the edge in the thermoplastic material, and stopping the mechanical vibration and causing the thermoplastic material to re-solidify, whereby the re-solidified thermoplastic material at least partially embedding the edge anchors the anchoring part in the first object.

Alternatively, the anchoring may be done using another method that allows to fixedly determine the rotational position of the anchoring part with respect to a first object.

The first object instead of being an object that has a sheet portion (for example by the first object being a metal sheet) may also have any other shape. In an example, the first object is a lightweight building element, and anchoring the anchoring part may include using an approach as for example described in PCT/EP2017/056734.

The generally flat portion may be a metal sheet portion. Alternatively, it may be any other portion defining an edge, for example manufactured by a casting method.

The generally flat portion may define a plane in a vicinity of the location where the anchoring part is attached, but with a section of the generally flat portion projecting away from the plane towards the proximal direction. The plane may define the x-y plane to which the z direction is perpendicular. In embodiments in which the first object and the second object each have a plurality of fastening locations, the fastening location may define a median plane, which plane in these embodiments may alternatively define the x-y-plane.

In accordance with a further possibility, the z direction may be defined to be the direction along which a relative force between the anchoring part and the first object is applied when the anchoring part is anchored with respect to the first object. Such relative force may be a pressing force applied together with coupling the mechanical vibration into the anchoring part, a pressing force applied while an adhesive is hardened, a pressing force applied by a state-of-the art fastener that anchors the anchoring part, etc.

The invention also concerns an assembly of a first object, a second object and a plurality of adaptors with an anchoring part and an adjustment part, wherein at least one of a control surface of the anchoring part and of a control surface of the adjustment part is helical. The anchoring parts of the arrangement are anchored with respect to the first object. The adjustment parts are each secured to the anchoring part by a suitable preferably but not necessarily releasable connection.

Especially, in the arrangement the fastening portions of the different adjustment parts may be aligned with each other, so that there is for example a connection to the second object in which the second object is at least locally slidable with respect to one in-plane direction (direction at least approximately perpendicular to the z axis).

In this text, the expression "thermoplastic material being capable of being made flowable e.g. by mechanical vibration" or in short "liquefiable thermoplastic material" or "liquefiable material" or "thermoplastic" is used for describing a material including at least one thermoplastic component, which material becomes liquid (flowable) when heated, in particular when heated through friction i.e. when arranged at one of a pair of surfaces (contact faces) being in contact with each other and vibrationally moved relative to each other. In some situations, for example if the first object itself has to carry substantial loads, it may be advantageous if the material has an elasticity coefficient of more than 0.5 GPa. In other embodiments, the elasticity coefficient may be below this value, as the vibration conducting properties of the first object thermoplastic material do not play a role in the process. In special embodiments, the thermoplastic material therefore may even include a thermoplastic elastomer.

Thermoplastic materials are well-known in the automotive and aviation industry. For the purpose of the method according to the present invention, especially thermoplastic materials known for applications in these industries may be used.

A thermoplastic material suitable for embodiments of the method according to the invention is solid at room temperature (or at a temperature at which the method is carried out). It preferably includes a polymeric phase (especially C, P, S or Si chain based) that transforms from solid into liquid or flowable above a critical temperature range, for example by melting, and re-transforms into a solid material when again cooled below the critical temperature range, for example by crystallization, whereby the viscosity of the solid phase is several orders of magnitude (at least three orders of magnitude) higher than of the liquid phase. The thermoplastic material will generally include a polymeric component that is not cross-linked covalently or cross-linked in a manner that the cross-linking bonds open reversibly upon heating to or above a melting temperature range. The polymer material may further include a filler, e.g. fibers or particles of material that has no thermoplastic properties or has thermoplastic properties including a melting temperature range that is considerably higher than the melting temperature range of the basic polymer.

Specific embodiments of thermoplastic materials are: Polyetherketone (PEEK), polyesters, such as polybutylene terephthalate (PBT) or Polyethylenterephthalat (PET), Polyetherimide, a polyamide, for example Polyamide 12, Polyamide 11, Polyamide 6, or Polyamide 66, Polymethylmethacrylate (PMMA), Polyoxymethylene, or polycarbonateurethane, a polycarbonate or a polyester carbonate, or also an acrylonitrile butadiene styrene (ABS), an Acrylester-Styrol-Acrylnitril (ASA), Styrene-acrylonitrile, polyvinyl chloride, polyethylene, polypropylene, and polystyrene, or copolymers or mixtures of these.

In addition to the thermoplastic polymer, the thermoplastic material may also include a suitable filler, for example reinforcing fibers, such as glass and/or carbon fibers. The fibers may be short fibers. Long fibers or continuous fibers may be used especially for portions of the first and/or of the second object that are not liquefied during the process.

The fiber material (if any) may be any material known for fiber reinforcement, especially carbon, glass, Kevlar, ceramic, e.g. mullite, silicon carbide or silicon nitride, high-strength polyethylene (Dyneema), etc.

Other fillers, not having the shapes of fibers, are also possible, for example powder particles.

Mechanical vibration or oscillation suitable for embodiments of the method according to the invention that include applying mechanical vibration has preferably a frequency between 2 and 200 kHz (even more preferably between 10 and 100 kHz, or between 20 and 40 kHz) and a vibration energy of 0.2 to 20 W per square millimeter of active surface.

In many embodiments, especially embodiments that include coupling the vibration into the anchoring part, the vibrating tool (e.g. sonotrode) is e.g. designed such that its contact face oscillates predominantly in the direction of the tool axis (the proximodistal axis, corresponding to the axis along which the first object and second objects are moved relative to one another by the effect of the energy input and pressing force when the edge is caused to penetrate into material of the first object; longitudinal vibration) and with an amplitude of between 1 and 100 µm, preferably around 30 to 60 µm. Such preferred vibration is e.g. produced by ultrasonic devices as e.g. known from ultrasonic welding.

Depending on the application, a vibration power (more specifically: the electrical power by which an ultrasonic transducer is powered) may be at least 100 W, at least 200 W, at least 300 W, at least 500 W, at least 1000 W or at least 2000 W.

In this text, the terms "proximal" and "distal" are used to refer to directions and locations, namely "proximal" is the side from which an operator or machine applies the mechanical vibration, whereas distal is the opposite side.

BRIEF DESCRIPTION OF THE DRAWINGS

In the following, ways to carry out the invention and embodiments are described referring to drawings. The drawings are all schematical in nature. In the drawings, same reference numerals refer to same or analogous elements. The drawings show.

DETAILED DESCRIPTION OF THE INVENTION

Figure 1:
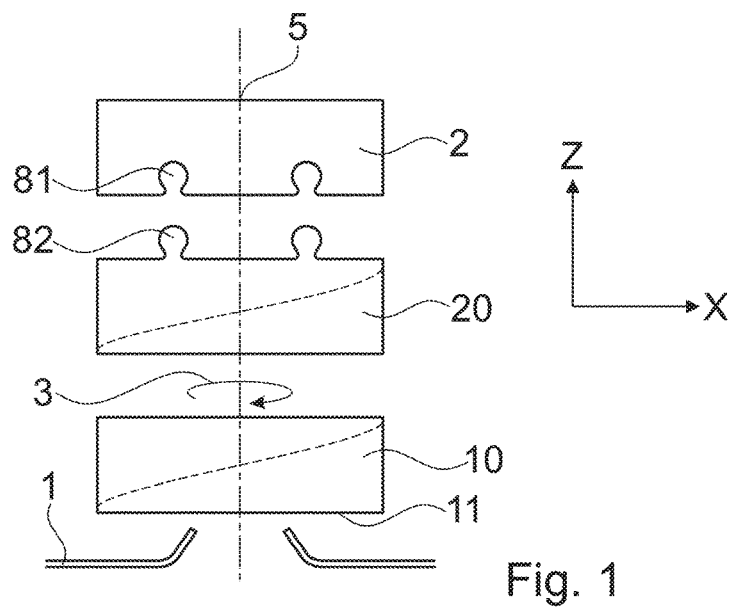
FIG. 1 an arrangement of a first object, a second object and an adaptor.

FIG. 1 schematically depicts a first object 1 and a second object 2 to be anchored with respect to the first object. The anchor used for this purpose is an adaptor including two parts, namely an anchoring part 10 and an adjustment part 20.

The anchoring part 10 is equipped to be fastened relative to the first object. The surface of the anchoring part 10 facing towards the first object 1 during the anchoring process is called "anchoring surface" 11 in this text. Examples of approaches for fastening the anchoring part relative to the first object are briefly described hereinbelow.

The adjustment part 20 has a fastening portion 82, cooperating with an according structure 81 of the second object 2 to secure the second object to the adjustment part 20. In this, the fastening portion and the according structure of the second object are such that the relative orientation of the adjustment part and the second object is determined at least within a range, i.e. the fastening portion does not have rotational symmetry with respect to the axis 5. This does not exclude the possibility that a plurality of discrete relative orientations are possible, i.e. the fastening portion may optionally be symmetrical with respect to rotations around 360°/n with n being an integer greater than or equal to 2 but for example not greater than 8.

More in concrete, in the depicted embodiment, the second object 2 includes a plurality of indentations that together serve as engagement structure 81 cooperating with an according plurality of protrusions of the adjustment part, which protrusions together serve as fastening portion 82. The arrangement of the indentations and protrusions defines a discrete number of possible relative orientations, for example a single possible relative orientation, or also two, three or more possible relative orientations (for example three relative orientations would be possible if the protrusions/indentations would be arranged in a equilateral triangle).

Of course, the arrangement can be reversed or partially reversed, i.e. the second object may include at least one protrusion cooperating with an according indentation/according indentations of the adjustment part.

The anchoring part and the adjustment part are equipped with a structure that causes the relative z-position to be dependent on the relative orientation around the axis 5 of the anchoring part and the adjustment part when the adjustment part engages with the anchoring part, for example when the adjustment part is pressed against the anchoring part and/or secured relative to the anchoring part. This structure is schematically illustrated by the dashed lines in FIG. 1, and its principle is explained in more detail referring to FIGS. 2 and 3.

Figure 2:
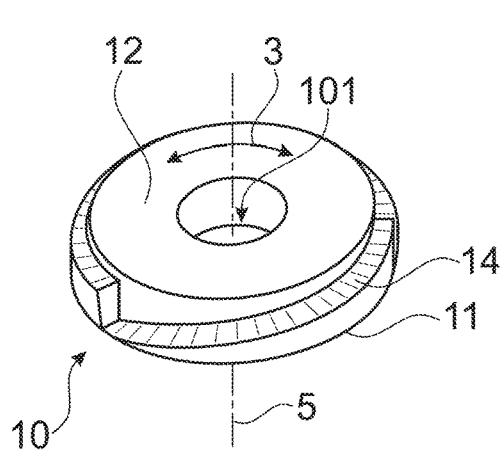
FIGS. 2 and 3 an anchoring part and an adjustment part of an adaptor, respectively.
Figure 3:
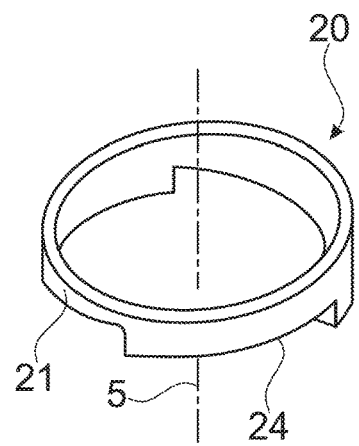

FIGS. 2 and 3 illustrate the principle of an anchoring part 10 and an adjustment part 20. The axis 5 between the anchoring part 10 and the adjustment part 20 is defined as a common axis, wherein a rotational position with respect to the axis of the adjustment part relative to the anchoring part is adjustable.

The anchoring part includes a first (proximally facing) control surface 14, and the adjustment part includes a second (distally facing) control surface 24, and the first and second control surfaces are adapted to each other for abutting against each other.

The first and the second control surfaces are both helical, with a same helix angle. Thereby, the z position of the adjustment part relative to the anchoring part is adjustable by rotation around the axis 5 when the control surfaces abut against each other.

According to an aspect of the invention, this is used in the following manner: It is assumed that the orientation of the adjustment part is 20 defined by its function and is fixed after the assembly process.

Initially, a target z position of the adjustment part relative to the first object is determined. For example, the target z position may depend on local deformation and/or variations of dimensions of the first object with respect to an external reference frame, wherein the z position of the adjustment part/second object relative to the reference frame needs to be at a given value.

Then, the relative orientation of the anchoring part and the adjustment part is derived from the target z position. This may be a rather simple procedure given the known helix angle; in embodiments the orientation angle may even be a value that is used to define the target z position.

Given the fact that the orientation of the adjustment part is defined by its function, the target relative orientation determines the orientation of the anchoring part. As a consequence, the orientation of the anchoring part is chosen to correspond to this target orientation (illustrated by the orientation double arrow 3 in FIGS. 1 and 2), and the anchoring part is fixed to the first object 1 in this orientation. Then, the adjustment part is secured to the anchoring part at the relative orientation given by its function (i.e. defined by the second object in the described embodiment). This securing may optionally be done together with placing the second object.

FIG. 3 for illustrating the principle of adjustment of the Z position only shows a control surface portion 21 of the adjustment part. However, the adjustment part in addition to the control surface portion 21 shown in FIG. 3 may include further structure, especially a body that carries or forms the fastening portion for securing the second object and the adjustment part relative to one another.

Especially in embodiments that do not require a compensation for different thermal expansion or other deformation not equal between the first and second objects, the adjustment part may be pre-assembled with the second object and may for example be one-piece with it.

Generally, the first and second control surfaces may include a plurality of sloped lane portions of for example equal length and for example also of equal average axial position. In the embodiment of FIGS. 2 and 3, the control surfaces have three lane portions, each extending by 120°. In other embodiments, the number of lane portions may be two or four or may be another number.

Figure 4:
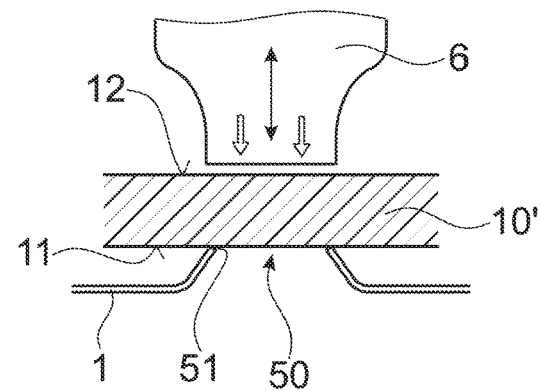
FIGS. 4 and 5 a possible principle of anchoring the anchoring part with respect to the first object.
Figure 5:
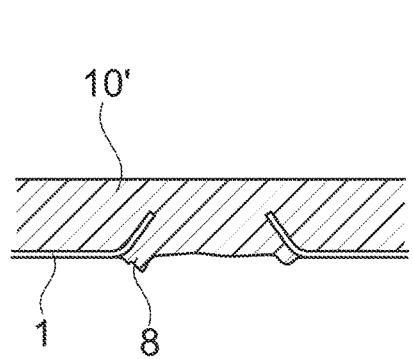

FIGS. 4 and 5 schematically illustrate one possible principle of attaching a further object 10'—for example an anchoring part 10 as discussed hereinbefore—to a first object 1. The method corresponds to the method taught in PCT/EP2016/073422. The first object 1 includes a metal sheet with a perforation 50. Around the perforation 50, the metal sheet forms an edge 51 that in the subsequent steps has the function of an energy director. The metal sheet is bent away from a metal sheet plane. More in concrete, it is bent towards proximally. A detailed description of the anchoring method as well as of considerations concerning the shape of the first object depending on the desired application and on parameters can be found in PCT/EP2016/073422.

The further object 10', i.e. the anchoring part 10 in embodiments of the present invention, and more in particular the one portion that forms the anchoring surface 11, includes thermoplastic material. A vibrating sonotrode 6 is pressed against a proximally facing coupling surface 12 and thereby presses the further object 10' against the first object in a vicinity of the perforation 50. Mechanical vibration energy thereby coupled into the further object 10' propagates via the first further object 10' and is absorbed at the places where the further object is in contact with the edge 51 that thereby serves as an energy director. As a consequence, the thermoplastic material around the edge 51 is heated and becomes flowable, allowing the projecting section of the sheet material to be pressed into the body of the further object. After re-solidification, this leads to an anchoring at least of the projecting section in the first object 1 and thereby to a mechanical positive-fit connection between the first object 1 and the further object 10'. The resulting arrangement is shown in FIG. 5. This Figure schematically illustrates material portions 8 that have flown to underneath the first object and thereby cause the mentioned anchoring.

Referring to FIG. 2, in this embodiment the proximally facing coupling surface corresponds to the proximal-most (uppermost in the orientation of FIG. 2) surface, and the anchoring surface 11 is the distal surface. The anchoring part may include a central through opening 101 that for the anchoring process is positioned approximately coaxially with the perforation 50 (an adjustment of the relative x-y position remains possible as the diameter of the perforation 50 is larger than the diameter of the through opening 101) and that may serve for example for accommodating a fastener that fastens the anchoring part and the adjustment part to each other and/or fastens the second object to the adaptor.

Figure 6:
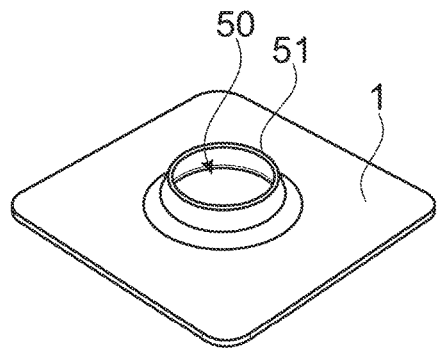
FIGS. 6 and 7 variants of shapes of the first object around a perforation.

FIG. 6 shows a view of a first object 1 or a section thereof with the perforation 50. In the embodiment of FIG. 6, the perforation is circular, i.e., the edge 51 runs along a circular path. Especially in embodiments where there is no torsional load on the connection between the first object and the adaptor, the adhesion of the flow portion to the first object material will be sufficient to keep the orientation of the anchoring part relative to the first object defined even if the geometry of the connection is rotationally symmetric.

Figure 7:
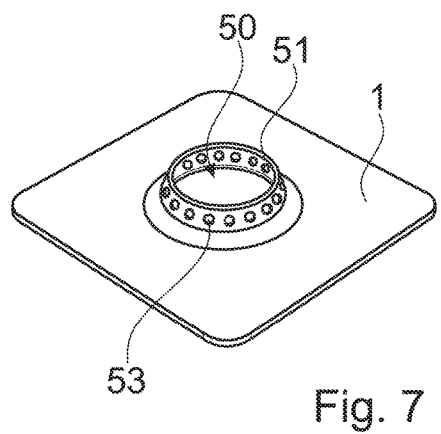

If this is not sufficient, the first object may have, along the edge, a shape that deviates from rotational symmetry, as for example illustrated in FIG. 7. Especially, the first object may have peripheral perforations 53 (FIG. 7) in addition to the main perforation 50, especially in the bent (sloped) section of the sheet portion of the first object, or may have an edge with a non-circular and possibly irregular shape, as for example also described in PCT/EP2017/056734.

Generally, including in embodiments that include anchoring the anchoring part with respect to the first object by the method that includes pressing the anchoring part against an energy directing structure of the first object until thermoplastic material of the anchoring part becomes sufficiently flowable, the first object does not necessarily need to include a metal sheet. Rather, other structures are an option also, including cast structures.

Figure 8:
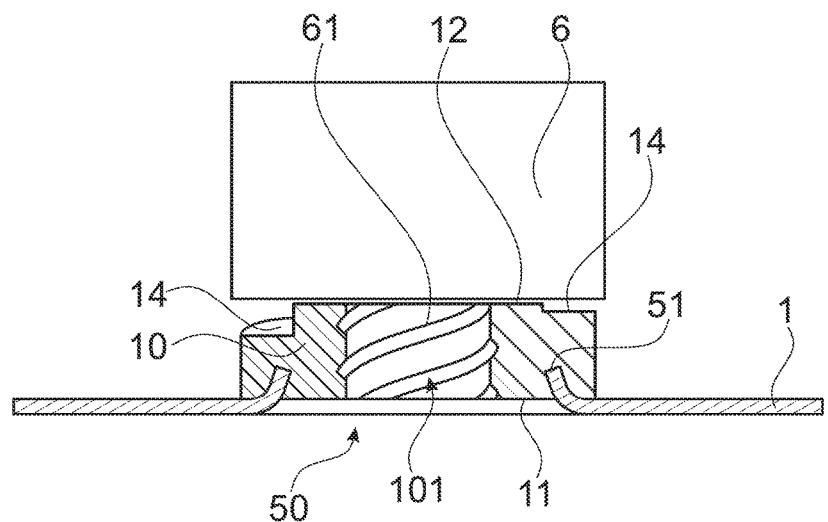
FIG. 8 an anchoring part during anchoring.

FIG. 8 illustrates an anchoring part 10 during the step of anchoring. The sonotrode 6 presses the anchoring part 10 against the first object 1 while the edge 51 is in contact with thermoplastic material of the anchoring part until the deformed section (the bent away section) of the first object 1 penetrates into the anchoring part.

Figure 9:
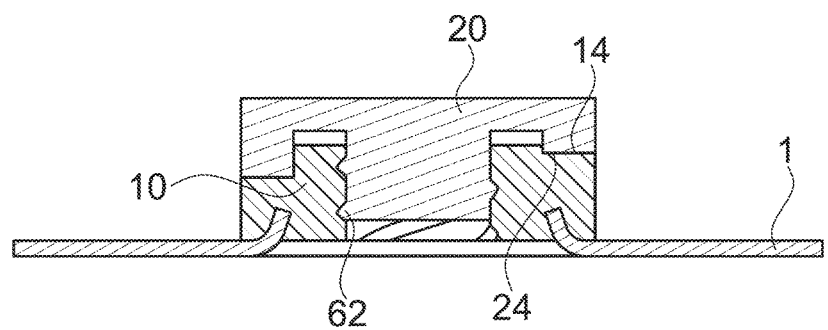
FIG. 9 the anchoring part of FIG. 11 anchored and with an adjustment part.

In the embodiment of FIG. 8, the anchoring part is depicted to have a central through opening 101 with retaining indentations 61 that in FIG. 8 run helically, whereby after anchoring an according retaining prong 62 of the adjustment part 20 may engage with the retaining indentation 61 or one of the retaining indentations so that the adjustment part may be clipped onto the anchoring part (FIG. 9). The helix angle of the retaining indentation(s) may be equal to the helix angle of the first control surface 14, whereby the clipping works independent of the relative orientation and according z position.

Fixation of the rotational position of the adjustment part relative to the anchoring part may in a group of embodiments be given by the application, in that the orientation of the adjustment part is defined and possibly fixed by the function of the adjustment part, for example by the adjustment part including a not circularly symmetrical nut slidable with respect to a groove/slot or similar of an object with which it cooperates.

In embodiments in which the orientation of the adjustment part is not dictated by its function, a fixation may be made for example by an axial fixation (clipped connection, screwed connection etc.) together with a stepped or sawtooth shaped or similar shape of at least a portion of respective surfaces at the interface, for example of the control surfaces. Other fixations of the orientation are possible and are within the scope of the present invention.

Figure 10:
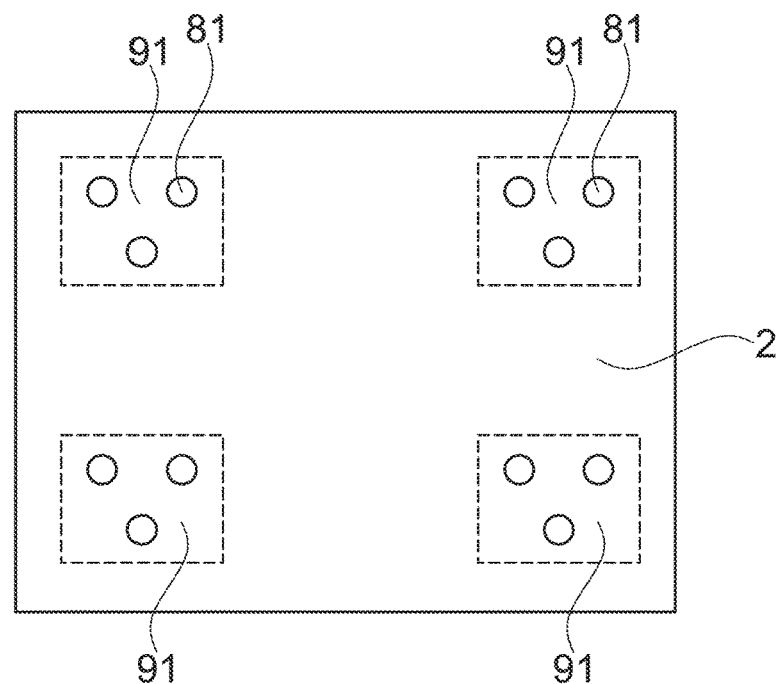
FIG. 10 locations of engagement structures on a second object.

FIG. 10 very schematically illustrates a second object 2 with a plurality of attachment locations 91, each for cooperating with one adjustment part. In FIG. 10, each attachment location 91 is illustrated to have three engagement structures 81 for cooperating with corresponding fastening structures of the respective adjustment part. By providing a second object with a plurality of attachment locations 91 in the sketched manner, also relatively large second objects may be secured to relatively large first objects, with the adaptors remaining compact.

Figure 11:
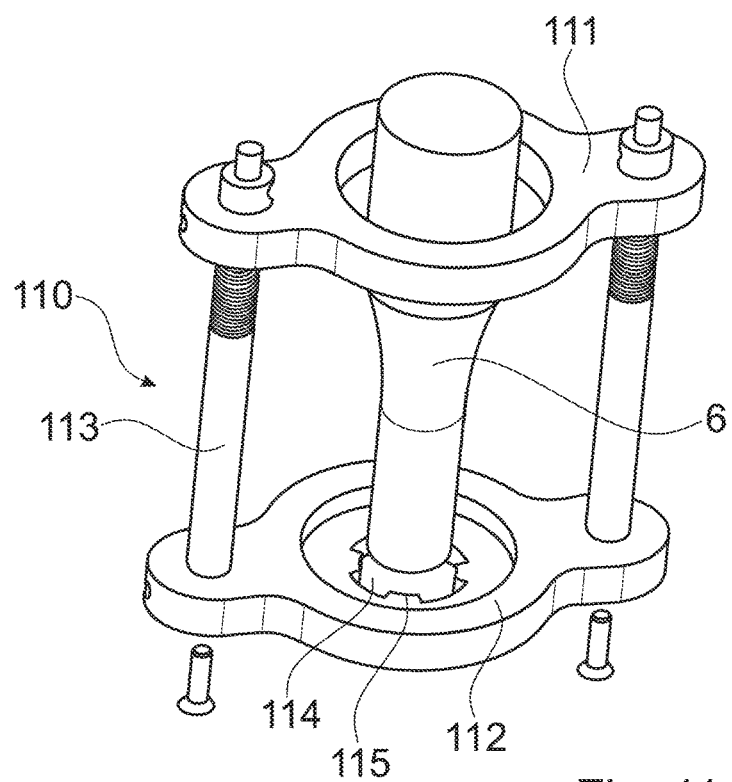
FIG. 11 a holding frame for defining the orientation of the anchoring part during anchoring thereof.

FIG. 11 illustrates a holding system for holding the orientation of an anchoring part relative to the first object during the anchoring process. In this, the first object is assumed to have a fixed rotational position, for example by being mounted to a working platform. The holding system includes a holding frame 110 with a distal holding element 112 and a proximal mount 111. The orientation and position of the holding element 112 relative to the mount is fixed by a plurality of rods 113, with the distance between the mount 111 and the holding element 112 here being adaptable.

A nodal point of the sonotrode 6 (fixation not shown in FIG. 11) is fixed to the mount 111. The holding element 112 forms a receiving opening 114 for receiving the anchoring part. In the depicted embodiment, the holding element 112 forms a plurality of inward protrusions 115 protruding radially inwardly into the receiving opening 114 for cooperating with according indentations (not shown in the previous figures) of the anchoring part to rotationally couple the anchoring part to the holding element 112.

By this construction, the whole assembly of sonotrode 6, holding frame 110 and anchoring part is rotatable to be rotated into the correct orientation for the required z position.

As an alternative to the shown configuration, the system may be simplified to only include the holding element 112 with an appropriate holding or mounting structure for choosing and holding the appropriate orientation. In such simplified system, rotation of the anchoring part around its z axis does not require rotation also of the sonotrode and of any apparatus coupled thereto.

What is claimed is:

1. A fastening method, comprising the steps of:
   providing a first object;
   providing an adaptor, the adaptor comprising an anchoring part and an adjustment part;
      wherein the anchoring part comprises a distally facing anchoring surface and a proximally facing first control surface;
      wherein the adjustment part comprises a distally facing second control surface positioned to abut against the first control surface;
      wherein the anchoring part and the adjustment part define a common axis,
      wherein the first control surface or the second control surface or both is/are helical with respect to the axis, whereby a relative z position of the adjustment part with respect to the anchoring part is defined by the relative orientation of the adjustment part with respect to the common axis while the second control surface abuts against the first control surface,
      and wherein a shape of the anchoring part and a shape of the adjustment part are adapted to each other so that the adjustment part may be brought into contact with the anchoring part by an essentially axial movement without any twisting movement being necessary to cause the second control surface to abut against the first control surface,
   determining a required orientation of the adjustment part;
   determining a target z position of the adjustment part;
   determining from the target z position a target relative orientation of the anchoring part and the adjustment part; and
   anchoring the anchoring part with respect to the first object in a fixed orientation relative to the first object, the fixed orientation being defined by the required orientation of the adjustment part and by the target relative orientation.

2. The method according to claim 1, wherein the anchoring part comprises thermoplastic material in a solid state at least at the anchoring surface, wherein the first object has a generally flat portion with an edge, and wherein the step of anchoring the anchoring part with respect to the first object comprises the sub-steps of:
   bringing the edge in contact with the anchoring surface;
   while the edge is in contact with the thermoplastic material, coupling mechanical vibration energy into the assembly until a flow portion of the thermoplastic material due to friction heat generated between the edge and the thermoplastic material becomes flowable and flows around the edge to at least partially embed the edge in the thermoplastic material; and
   stopping the mechanical vibration and causing the thermoplastic material to re-solidify, whereby the re-solidified thermoplastic material at least partially embedding the edge anchors the anchoring part in the first object.

3. The method according to claim 2, wherein the generally flat portion is a metal sheet portion.

4. The method according to claim 2, wherein the flat portion defines a plane and wherein the flat portion along the edge has a section projecting away from the plane towards a proximal direction.

5. The method according to claim 1, wherein anchoring the anchoring part with respect to the first object comprises gluing the anchoring part to the first object.

6. The method according to claim 1, wherein the first control surface and the second control surface are both helical with a same helix angle.

7. The method according to claim 1, further comprising the step of providing a second object, wherein the adjustment part comprises a fastening portion equipped to cooperate with the second object to fasten the second object to the adjustment part, wherein the fastening portion defines an orientation of the adjustment part relative to the second object, wherein in the step of determining a required orientation of the adjustment part the required orientation is determined from a required orientation of the second objet, and wherein the method comprises the further step of fastening the second object to the adjustment part.

8. The method according to claim 7, wherein the fastening portion and a corresponding engagement structure of the second object are adapted to each other for the fastening portion to be slidable with respect to the second object with respect to one dimension.

9. The method according to claim 7, wherein the second object is equipped to cooperate with a plurality of fastening portions, the method comprising providing a plurality of adaptors, each the comprising an anchoring part and an adjustment part, and wherein the steps of determining a required orientation, determining a target z position, determining a target relative orientation, anchoring, and fastening the second object are carried out for each one of the adaptors.

10. The method according to claim 2, wherein the first control surface and the second control surface are both helical with a same helix angle.

11. The method according to claim 3, wherein the first control surface and the second control surface are both helical with a same helix angle.

12. The method according to claim 4, wherein the first control surface and the second control surface are both helical with a same helix angle.

13. The method according to claim 5, wherein the first control surface and the second control surface are both helical with a same helix angle.

\* \* \* \* \*